UNITED STATES PATENT OFFICE.

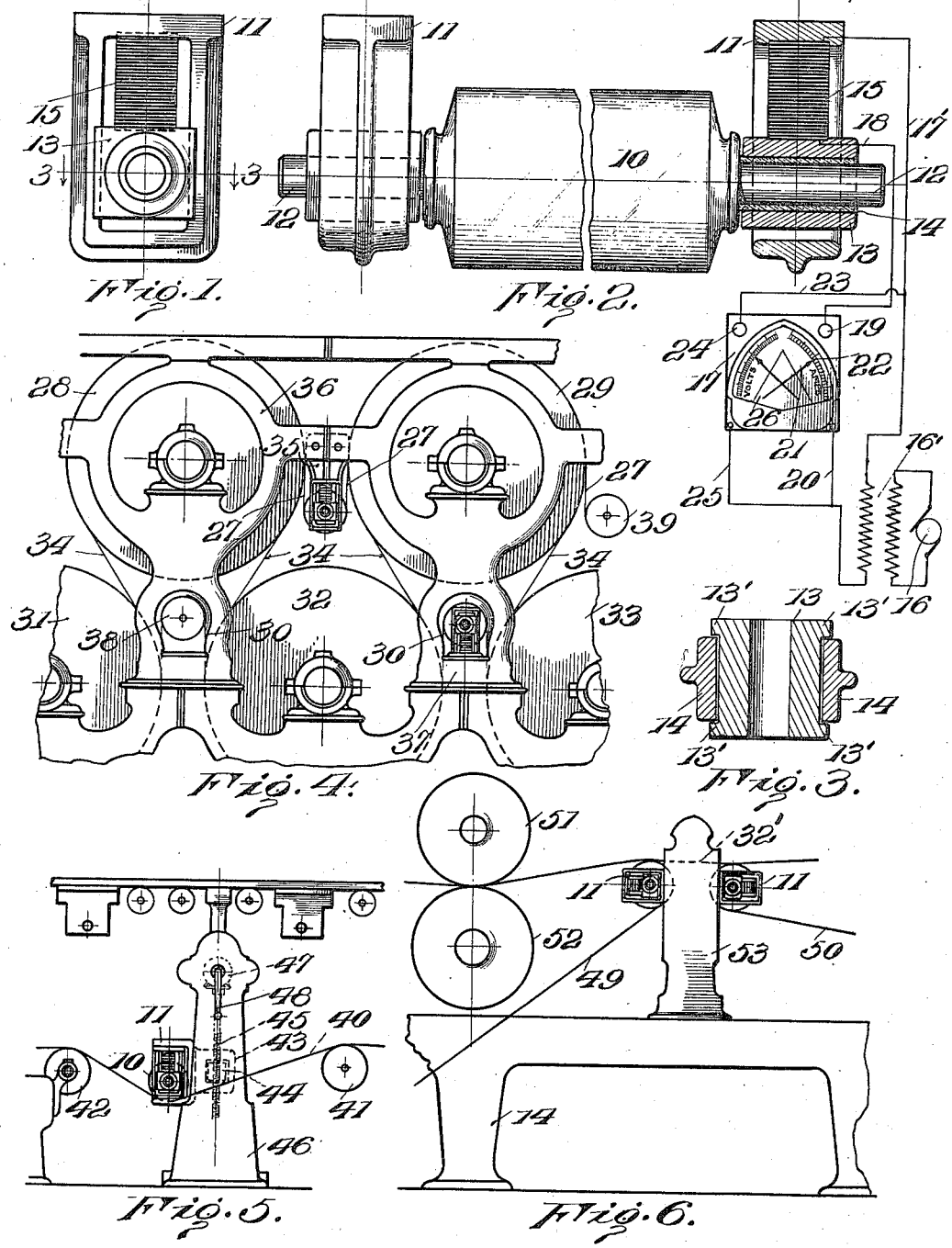

JOHN W. BRASSINGTON, OF WILMINGTON, DELAWARE.

TENSION-INDICATOR FOR FELTS, FOURDRINIER WIRES, AND PAPER SHEETS.

1,168,706.

Specification of Letters Patent.

Patented Jan. 18, 1916.

Application filed June 9, 1915. Serial No. 33,209.

*To all whom it may concern:*

Be it known that I, JOHN W. BRASSINGTON, a citizen of the United States of America, and a resident of Wilmington, Delaware, have invented a new and useful Improvement in Tension-Indicators for Felts, Fourdrinier Wires, and Paper Sheets, which invention is fully set forth in the following specification.

The present invention is an improvement in tension-indicators, and particularly is a device for indicating the tension of felts, Fourdrinier wires, paper and the like in paper-making machines.

The need for a tension-indicator in connection with felts and Fourdrinier wires in paper-making machines has long been manifest, because these elements frequently and rapidly lengthen and shorten. Fourdrinier wires are expensive, and their life at the best is very short; and it is highly important that the danger of injury under excessive tension should be eliminated. The felts used on paper-making machines are also very costly, and excessive shrinkage, maintained for an appreciable length of time, would be destructive of said felts or the rolls around which they pass. These felts lengthen and shorten very rapidly, and, in a modern paper-making machine, the length of a felt will sometimes be altered as much as fifteen feet in a minute, and the felt subjected to a dangerous tension which, if maintained for any length of time, would seriously injure the same.

Not only is it of importance that the attendant should know just what is going on in the machine, but it is of great importance that the superintendent of the mill, while in his office, should be able to readily determine that the machine is receiving proper attention. A modern paper-making machine requires the attention of six or seven attendants, and it not infrequently happens, for example, that a couple of them will observe that the Fourdrinier wire needs tightening, and both of them, unknown to each other, will proceed to tighten it, thus imposing a dangerous tension on the wire. A Fourdrinier wire costs from $300. to $500., and its life, under normal conditions, is only from about ten days to three weeks; and this short life is still further curtailed unless the machine is carefully and intelligently handled. By the use of the present invention the personal equation of the attendants is eliminated so far as felts, wires and the paper are concerned, and undue tension in these elements is looked to, not when the attendant thinks it is required, but when the instrument indicates the need.

The device of the present invention embodies an indicator which is electrically actuated, and preferably this indicator is associated with a roller around which the felt, wire or paper passes. In the preferred construction, this roller is so mounted as to permit one or both ends thereof to move when the tension of the felt or wire is altered, with respect to a compressible and expansible resistance member, one of which is preferably associated with each end of said roller, which elements control the flow of current to a tension-indicator which is located beside the machine, in the office of the superintendent or at any other desired point. When it is observed from the indicator that a dangerous tension is being placed on the felt, wire or paper, steps may at once be taken to relieve the strain, and thus prevent injury which would otherwise almost inevitably follow.

The invention will be better understood by reference to the accompanying drawing, illustrating various expressions of the inventive idea, and wherein—

Figure 1 is an end elevation illustrating the mounting of one end of a shaft which carries a roller around which the felt, wire or the like passes; Fig. 2 is a longitudinal elevation corresponding to Fig. 1; Fig. 3 is a transverse section on the line 3—3 of Fig. 1; Fig. 4 is a side elevation showing the device of the present invention associated with felts passing around the upper and lower drier cylinders of a paper-making machine; Fig. 5 is an elevation illustrating the device in association with a Fourdrinier wire; and Fig. 6 shows the device in association with felts in the press part of a paper-making machine.

Referring to the drawings, in which like reference numerals indicate like parts, 10 is a suitable element, here shown as a roller, around which passes the felt, wire, paper or the like, the tension of which is to be indicated. This roller is movable bodily in frames 11—11, one frame being provided at each end of the roller. Preferably this roller is provided with a shaft 12 and each end of said shaft projects through and is carried by a journal box 13, a bushing 14 of suitable material being interposed between said shaft and journal. This journal box is, in the preferred embodiment, rectangular in cross-section, and is provided with projections 13' (Fig. 13) which engage snugly around the frame 11, thus preventing endwise movement of the roller 10, which would act to injure the felt, wire or paper passing therearound.

According to the present invention, when the tension of the felt, wire or paper is increased, the roller 10 is bodily moved along the frame 11, and an indication of this movement is given on a suitable instrument, which may be under the eye of the attendant or his superintendent. This instrument is electrically actuated and, in the preferred embodiment of the inventive idea, the amount of current which passes to the instrument is directly affected by the tension of the felt, wire or paper. This end is preferably secured by interposing between each journal box 13 and one end of frame 11 a compressible and expansible resistance element 15 of suitable construction, this resistance element being included in a circuit with a source of electric current, here shown as a generator 16 (having a transformer 16' associated therewith) and an indicating instrument 17. While, for the sake of clearness, a resistance element 15 is shown in association with only one end of roller 10, it is to be understood that such an element is preferably associated with each end of roller 10 so that the tension of each lateral marginal extremity of the felt, wire or paper may be indicated, either on the same or a separate instrument, as it sometimes happens that an undue tension exists along one edge and not along the other. Preferably this resistance element is so constructed that its electrical resistance is decreased as the element is compressed, and increased as the pressure is removed. It has been found that a series of carbon disks, piled one upon the other, satisfactorily effects the control of the current for this purpose. Preferably a carbon pack which compensates for temperature changes is employed, as a larger amount of current passes through the disks when they are compressed, and this increased flow of current increases the temperature of the resistance element, and thereby decreases its normal resistance. It has been found that by the use of what is known to the trade as the "Bradley carbon pack," the readings on the instrument 17 will be correct at all times, without it being necessary to make calculations for temperature changes.

The resistance element 15 is connected to the generator 16 by a conductor 17' which is secured to one end of the resistance element, a conductor 18 being connected to the other end of the resistance element, and to a binding post 19 on the instrument 17. The current from the generator flows through said conductor 17', the resistance element 15, conductor 18, a current coil (not shown) in the instrument 17, and a wire 20 which is electrically connected to said current coil. A needle 21, which is responsive to the current in this circuit, is associated with a scale 22, which is here indicated as calibrated for an ampere reading. The amount of current flowing in this circuit depends upon the state of compression of the resistance element 15. If the compression is high, a larger amount of current flows through the circuit, and if there is low compression, a small amount is allowed to pass, this condition of things being indicated on the scale 22 by the needle 21. While this scale is calibrated for amperes, it is to be understood that it may be calibrated for any other desired units, the ultimate end being to indicate the tension of the moving wire or felt.

In view of the fact that the voltage of the circuit does not remain constant, a voltage-indicating circuit is provided, which is as follows: A conductor 23 is connected to conductor 17' near the point of the connection of the latter to resistance element 15, the other end of said conductor 23 being electrically connected to a binding post 24 on the instrument 17. This binding post 24 is in turn connected to a voltage coil (not shown) in the instrument 17, and a conductor 25 connects the other end of said voltage coil to conductor 20. A needle 26 oscillates over a voltage scale and indicates any changes in voltage in the circuit just described. According to ohms law, the voltage is equal to the current multiplied by the resistance of the circuit and, therefore, with the voltage and current indicated by needles 26 and 21, respectively, the resistance of the circuit, and accordingly the correct tension of the felt or wire can be readily calculated. The two scales described, or any other scale or scales with which the instrument 17 is provided, have preferably associated therewith designating marks which indicate dangerous tension in the felt or wire. It will be understood that these marks will have to be altered according to whether a felt, wire or paper sheet constitutes the moving element, the tension of which is of interest to the observer, and also according to the structure of the resistance element 15, which controls the flow of current to the instrument 17. When the voltage is substantially constant a reading of scale 22 will satisfactorily indicate the tension of the element with which the instrument is associated.

In Fig. 4 the device is shown in association with felt 27 which passes around upper drier cylinders 28 and 29, the device being also shown in association with lower felt 30 passing around lower drier cylinders 31, 32 and 33. 34 indicates the sheet of paper which is conveyed around the various drier cylinders by said felts. The device which is shown in association with the upper felt 27 is suspended by a bracket 35 connected to one of the end frames 36 in which the drier cylinders are journaled; and the device shown in association with the lower drier cylinders is suitably mounted, in any desired manner, on a standard 37 provided on a corresponding end frame in which the lower drier cylinders are mounted. An increase of tension in the felt 27 acts to move the journal box 13 upwardly, thus compressing the disks of the resistance element 15 and permitting an increased volume of current to flow to the instrument 17; whereas an increase of tension in the felt 30 associated with the lower drier cylinders effects a downward movement of journal box 13 and a corresponding compression of resistance element 15. It will be observed that an idler roller 38 is interposed between lower drier cylinders 31 and 32, and that the felt 30 passes around said idler roller; and, normally, a roller mounted similarly to idler 38, is interposed between cylinders 32 and 33. When the present invention is employed, the roller 10, mounted as indicated, replaces the idler between cylinders 32 and 33. In connection with the upper felt 27 similar idlers are usually employed, the roller 10 replacing the idler between drier cylinders 28 and 29. An idler 39 is interposed between drier cylinder 29 and the succeeding drier cylinder.

In Fig. 5 the device is illustrated in association with a Fourdrinier wire 40, which wire is shown passing over rollers 41 and 42. The frame 11 is here provided with a lateral extension 43, which extension carries a nut 44. A screw 45 is mounted in a standard 46 in any suitable manner, and said screw passes through nut 44 and extension 43. This screw is provided at its upper end with a bevel gear (not shown) which meshes with a corresponding bevel gear 47 to which a handle 48 is connected. Should the instrument 17 indicate a dangerous or undesirable tension in the Fourdrinier wire 40, rotation of the handle 48 will quickly remove the roller 10 from said wire, thus relieving the tension. On the other hand, rotation of said handle in the opposite direction acts to apply tension to the wire 40.

In Fig. 6 the invention is shown applied to felts 49 and 50, in the press part of the machine, which felts carry the sheet of paper 32' that has come from between press rolls 51 and 52. In this structure the frames 11 are shown as fastened, in any desired manner, to a standard 53. Increased tension of felt 50 acts to move the journal 13 on the right-hand side of standard 53 toward the right, and increased tension of felt 49 acts to move the journal 13 on the left-hand side of standard 53 toward the left. Felts 49 and 50 should be subjected to substantially the same tension, in order that the sheet of paper 32 will not be pulled apart or injured, due to a substantial difference in speed of travel of felts 49 and 50.

While for the purpose of illustration, one expression of the inventive idea has been shown and described in detail in various relations, it is to be understood that the invention is not limited to the forms illustrated, but that the inventive idea is susceptible of various mechanical expressions within the limits of the appended claims.

What is claimed is:—

1. In a paper-making machine, the combination of a movable element such as a felt, Fourdrinier wire or paper sheet, a roller around which said element passes, an abutment associated with said roller and in relation to which said roller is bodily movable, an electric circuit including a compressible and expansible member mounted between said roller and abutment, a source of electric current, and an instrument for indicating the degree of compression of said member.

2. In a paper-making machine, the combination of a movable element such as a felt, Fourdrinier wire or paper sheet, a roller around which said element passes, an abutment associated with said roller and in relation to which said roller is bodily movable under variations of tension in said element, and a series of disks mounted between said roller and abutment, and means indicating the degree of compression of said disks.

3. In a paper-making machine, the combination of a movable element such as a felt, Fourdrinier wire or paper sheet, a roller around which said element passes, an abutment associated with said roller and in relation to which said roller is bodily movable, a journal box associated with one end of said roller, a resistance element interposed between said journal box and abutment, and electrically-actuated means indicating the degree of compression of said member.

4. In combination, a movable element such as a felt, Fourdrinier wire or paper sheet, a roller around which said element passes, a journal associated with one end of said roller, a frame along which said journal box is movable in response to variations in tension of said element, and an electric circuit including a compressible and expansible member mounted between said journal box and frame, a source of electric current, and an instrument indicating the degree of compression of said member.

5. In combination, a movable element such as a felt, Fourdrinier wire or paper sheet, a roller around which said element passes, a journal box in which one end of said roller rotates, a frame along which said journal box is movable in response to variations of tension in said element, and an electric circuit including a series of disks interposed between said journal box and frame, a source of electric current, and an instrument for indicating the degree of compression of said disks.

6. In combination, a movable element such as a felt, Fourdrinier wire or paper sheet, a roller around which said element passes, a journal box in which one end of said roller rotates, a frame along which said journal box is movable in response to variations of tension in said element, an electric circuit including a series of disks interposed between said journal box and frame, a source of electric current, an instrument for indicating the degree of compression of said disks, and means for relieving excessive tension in said element.

7. In a paper-making machine, the combination of a movable element such as a felt, Fourdrinier wire or paper sheet, a member around which said element passes, an abutment in relation to which said member is bodily movable in response to variations of tension in said element, a compressible and expansible body interposed between said member and abutment, electrically-actuated means indicating the degree of compression of said body, and means for relieving excessive tension in said element.

8. In a paper-making machine, the combination of a movable element such as a felt, Fourdrinier wire or paper sheet, a roller around which said element passes, a journal box in which one end of said roller rotates, a frame along which said journal box is movable in response to variations in tension, a series of carbon disks interposed between said journal box and frame, a source of electric current, and an instrument for indicating both voltage and amperage, and electrical connections including in circuit said disks, source of current and instrument.

9. In a paper-making machine, the combination of a movable body such as a felt, Fourdrinier wire or paper sheet, a member with which said body engages, an abutment associated with said member and in relation to which said member is movable under variations of tension in said body, a yielding element associated with said member and abutment and adapted to be affected by the movement of said member, and means indicating the condition of said element.

10. In a paper-making machine, the combination of a movable body such as a felt, Fourdrinier wire, or paper sheet, a member with which said body engages, an abutment associated with said member and in relation to which said member is movable under variations of tension in said body, a yielding element interposed between said member and abutment and adapted to be affected by the movement of said member, and means indicating the degree of compression of said element.

11. In a paper-making machine, the combination of a movable body such as a felt, Fourdrinier wire or paper sheet, a member with which said body engages, an abutment associated with said member and in relation to which said member is movable under variations of tension in said body, a yielding element interposed between said member and abutment and adapted to be affected by the movement of said member, means indicating the degree of compression of said element, and means for relieving excessive tension in said element.

12. In a paper-making machine, the combination of a movable body such as a felt, Fourdrinier wire or paper sheet, a member with which said body engages, an abutment associated with said member and in relation to which said member is movable under variations of tension in said body, a yielding element associated with said member and abutment and adapted to be affected by the movement of said member, and electrical means indicating the condition of said element.

In testimony whereof I have signed this specification in the presence of two subscribing witnesses.

JOHN W. BRASSINGTON.

Witnesses:
 GEO. E. SANDS,
 RALPH B. CARPENTER.